United States Patent [19]

Ahlert et al.

[11] Patent Number: 5,030,494

[45] Date of Patent: Jul. 9, 1991

[54] CARBON OVERCOAT FOR A THIN FILM MAGNETIC RECORDING DISK CONTAINING DISCRETE CLUSTERS OF TUNGSTEN (W) OR TUNGSTEN CARBIDE (WC) WHICH PROJECT FROM THE SURFACE OF THE OVERCOAT

[75] Inventors: Richard H. Ahlert, San Jose; James K. Howard, Morgan Hill; Kwang K. Kim, San Jose; Ian L. Sanders, Morgan Hill; Anthony W. Wu, San Jose, all of Calif.

[73] Assignee: International Business Machines Corporation, Armonk, N.Y.

[21] Appl. No.: 302,844

[22] Filed: Jan. 26, 1989

[51] Int. Cl.$^5$ ............................................. G11B 23/00
[52] U.S. Cl. .................................. 428/64; 428/694; 428/699; 428/408; 204/192.15
[58] Field of Search ............... 428/900, 694, 699, 408, 428/64; 204/192.1, 192.15, 192.2

[56] References Cited

U.S. PATENT DOCUMENTS

| | | | |
|---|---|---|---|
| 3,912,461 | 10/1975 | Wakefield | 29/195 |
| 4,525,417 | 6/1985 | Dimigen et al. | 428/244 |
| 4,578,729 | 3/1986 | Suzuki et al. | 360/134 |
| 4,597,844 | 7/1986 | Hiraki et al. | 204/192 SP |
| 4,647,494 | 3/1987 | Meyerson et al. | 428/216 |
| 4,675,240 | 6/1987 | Weiss | 428/611 |
| 4,680,218 | 7/1987 | Kimura et al. | 428/195 |
| 4,778,582 | 10/1988 | Howard | 204/192.15 |
| 4,789,913 | 12/1988 | Gregory et al. | 360/97.03 |
| 4,840,843 | 6/1989 | Sano et al. | 428/336 |

FOREIGN PATENT DOCUMENTS

| | | |
|---|---|---|
| 061106 | 4/1984 | Japan . |
| 139871 | 12/1985 | Japan . |
| 61-105720 | 5/1986 | Japan . |
| 61-054017 | 6/1986 | Japan . |
| 043823 | 2/1987 | Japan . |
| 125522 | 6/1987 | Japan . |
| 63-102014 | 9/1988 | Japan . |

OTHER PUBLICATIONS

H. Dimigen, et al., "Tribological and Electrical Properties of Metal-Containing Hydrogenated Carbon Films," Appl. Phys. Lett. 50(16), 20 Apr. 1987, pp. 1056–1058.

H. Dimigen, et al., "Applying Low-Friction Wear-Resistant Thin Solid Films by Physical Vapour Deposition," Philips Tech. Rev. 41, 1983, 84, pp. 186–197.

H. Koberle et al., "Electrical Conductivity and Structure of Metal-Containing Hydrogenated Carbon Films," E–MRS Meeting, Jun. 1987, vol. XVII, pp. 458–490.

M. Grischke et al., "Evidence for the Formation of Carbidic Carbon in Ta-Doped a-C:H Layers," E–MRS Meeting, Jun. 1987, vol. XVII, pp. 491–497.

E. Bergmann et al., "Tribological Properties of Metal/Carbon Coatings", J. Vac. Sci. Technol. A4(6), Nov./Dec. 1986, pp. 2868–2869.

Primary Examiner—Merrell C. Cashion, Jr.
Assistant Examiner—Stevan A. Resan
Attorney, Agent, or Firm—Thomas R. Berthold

[57] ABSTRACT

A thin film metal alloy magnetic recording disk has an improved protective overcoat which is both wear resistant and which creates a low level of stiction in a rigid disk file. In a preferred embodiment the overcoat is a film of essentially amorphous carbon or hydrogen-containing carbon with relatively small amounts of additives of iron (Fe), tungsten (W) or tungsten-carbide (WC). The structure of the overcoat is a relatively smooth planar carbon surface with discrete clusters of the additives which project slightly above the smooth carbon surface. The specific additives to the carbon overcoat improve the wear resistance of the disk and permit the sliders to contact the disks in contact start/stop (CSS) operation without damage to any of the disk file components.

6 Claims, 3 Drawing Sheets (a) W-doped Carbon (Silicon Substrate)

(a) W-doped Carbon (Silicon Substrate)

(b) Undoped Carbon (Silicon Substrate)

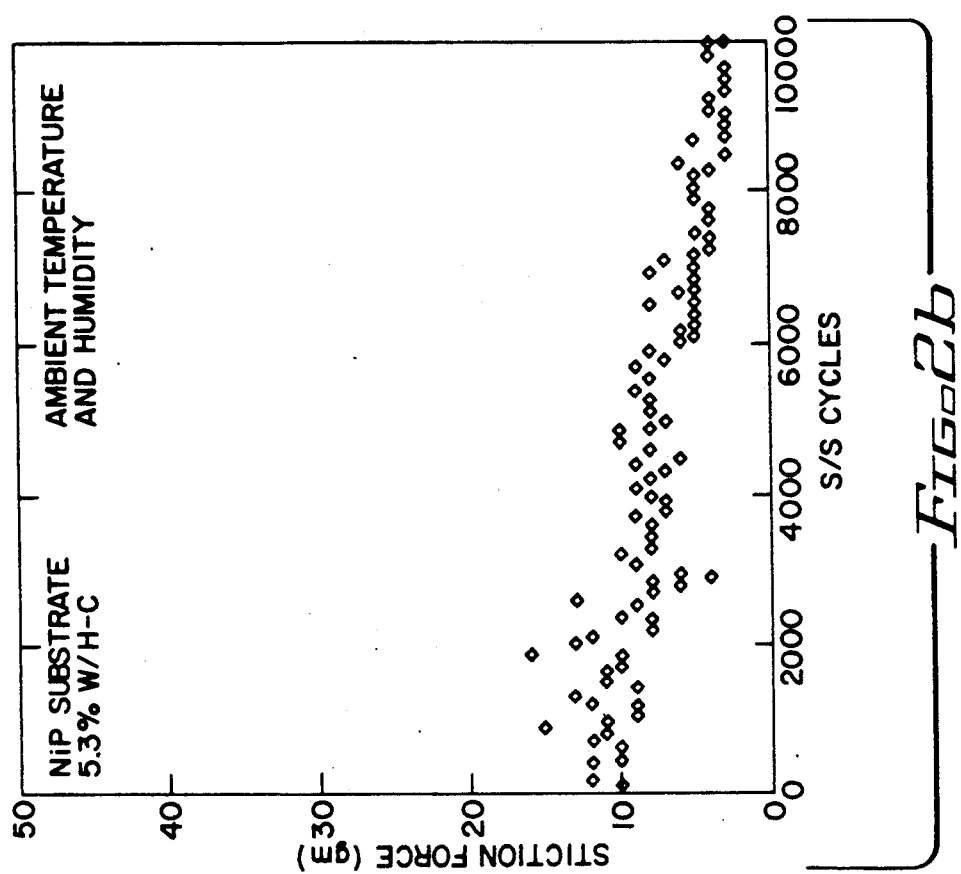
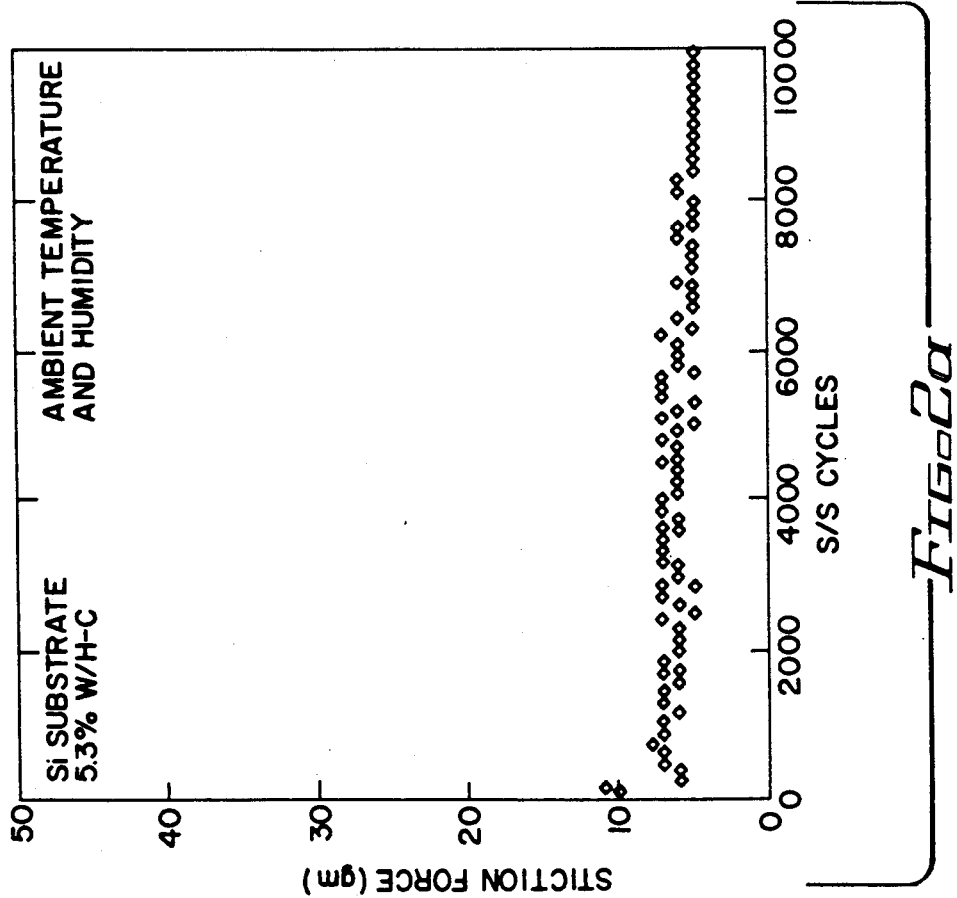

CARBON OVERCOAT FOR A THIN FILM MAGNETIC RECORDING DISK CONTAINING DISCRETE CLUSTERS OF TUNGSTEN (W) OR TUNGSTEN CARBIDE (WC) WHICH PROJECT FROM THE SURFACE OF THE OVERCOAT

TECHNICAL FIELD

This invention relates to a thin film metal alloy magnetic recording disk, and in particular to such a disk having a protective overcoat of a metal-containing or metal carbide-containing carbon film. The invention also relates to a contact start/stop (CSS) rigid disk file having such a disk as the magnetic recording medium.

BACKGROUND OF THE INVENTION

In many types of rotating rigid disk files, each of the read/write transducers or heads is supported on a slider which rides on a cushion or bearing of air above the surface of the disk when the disk is rotating at its operating speed. The slider is connected to a linear or rotary voice coil actuator by means of a relatively fragile suspension. There is generally a stack of disks and a number of actuators with each actuator supporting a number of sliders. The actuators move the sliders radially between the disks so that each head may access the recording area of a respective disk.

In these conventional disk files the slider is biased against the disk surface by a small force from the suspension when the disk is not rotating. The slider is thus in contact with the disk surface from the time the disk file is turned on until the disk reaches a speed sufficient to cause the slider to ride on the air bearing. The slider is again in contact with the disk surface when the disk file is turned off and the rotational speed of the disk falls below that necessary to create the air bearing. In such disk files a lubricant is often maintained on the disk surface to prevent damage to the head and the disk during starting and stopping of the disk.

One type of disk for use in rigid disk files is a thin film metal alloy disk which typically comprises a substrate, such as an aluminum-magnesium (AlMg) alloy with a nickel-phosphorous (NiP) surface coating, a cobalt-based alloy sputter deposited as the magnetic layer on the substrate, and a protective overcoat, such as a sputter-deposited amorphous carbon film, formed on the magnetic layer. U.S. Pat. No. 4,503,125 describes a protective overcoat of amorphous carbon formed by sputtering a graphite target. Amorphous hydrogenated carbon films formed by reactive sputtering of a graphite target in an atmosphere of argon and hydrocarbon gases have been suggested as suitable for use as thin film disk protective overcoats, as described in Japanese Kokai No. 60-157725. Assignee's U.S. Pat. No. 4,778,582 describes a protective hydrogenated carbon overcoat formed by sputtering a graphite target in the presence of Ar and hydrogen (H$_2$) In addition to the magnetic layer and the protective overcoat, thin film disks may also include a sputter-deposited underlayer, such as a layer of chromium (Cr), chromium-vanadium (CrV) or tungsten (W), between the substrate and the magnetic layer and a sputter deposited adhesion layer, such as a Cr, W or titanium (Ti) layer, between the magnetic layer and the protective overcoat.

A serious problem with such disk files is that after the slider has been in stationary contact with the disk surface (i.e. the protective overcoat) for just a short period of time, the slider tends to resist translational movement or "stick" to the disk surface. This "stiction" is caused by a variety of factors, including static friction and viscous shear forces and surface tension created by the lubricant between the disk and the slider. Even in those disk files which have disks with extremely smooth unlubricated disk surfaces, stiction may occur because of the strong intermolecular attraction at the interface between the smooth disk and slider surfaces. Stiction in a disk file can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension. The stiction problem is especially prevalent in those disk files which have amorphous carbon or hydrogen-containing carbon protective overcoats on the disks.

In order to prevent damage to the disk file caused by the stiction between the sliders and disk surfaces, various types of head load/unload mechanical and electromechanical devices have been built into disk files. A typical load/unload device thus moves the sliders away from the disk surfaces when the disk file is turned off and back towards the disk surfaces when the disk file is turned on. Thus, in contrast to conventional contact start/stop (CSS) disk files, in the "load/unload" type of disk files the sliders are never permitted to contact the disk surfaces.

In addition to the stiction problem, an additional problem in disk files which use thin film disks is the suitability of the protective overcoat to provide resistance to wear caused by contact of the disk by the air-bearing slider which carries the magnetic recording head.

Accordingly, it is desirable to have a protective overcoat for thin film metal alloy disks which is wear resistant and which presents a low static friction interface to the slider. With such an improved protective overcoat it is possible to have disk files which include all the advantages of both thin film metal alloy disks and CSS operation.

SUMMARY OF THE INVENTION

The invention is a thin film metal alloy magnetic recording disk having an improved protective overcoat which is both wear resistant and which creates a low level of stiction in a CSS disk file. In a preferred embodiment the overcoat is a film of essentially amorphous carbon or hydrogen-containing carbon with relatively small amounts of embedded iron (Fe), tungsten (W) or tungsten-carbide (WC). These specific additives to the carbon overcoat improve the wear resistance of the disk and permit the sliders to contact the disks in CSS operation without damage to any of the disk file components. In particular, the protective overcoat has a relatively smooth planar carbon surface with discrete clusters of the additives which project slightly above the smooth carbon surface. It is this particular characteristic of the protective overcoat which is believed responsible for the low static friction. Thus the present invention is also directed to a rigid disk file of the CSS type wherein the thin film metal alloy disks have the above-described protective overcoat.

For a fuller understanding of the nature and the advantages of the present invention, reference should be made to the following detailed description taken in conjunction with the accompanying drawings.

BRIEF DESCRIPTION OF THE DRAWINGS

FIGS. 2(a) and (b) are plots of initial stiction (in grams) as a function of CSS cycles on W impregnated amorphous hydrogenated carbon films formed on a polished Si substrate, and on a polished NiP substrate with a W underlayer.

DESCRIPTION OF THE PREFERRED EMBODIMENTS

Figure 1A:
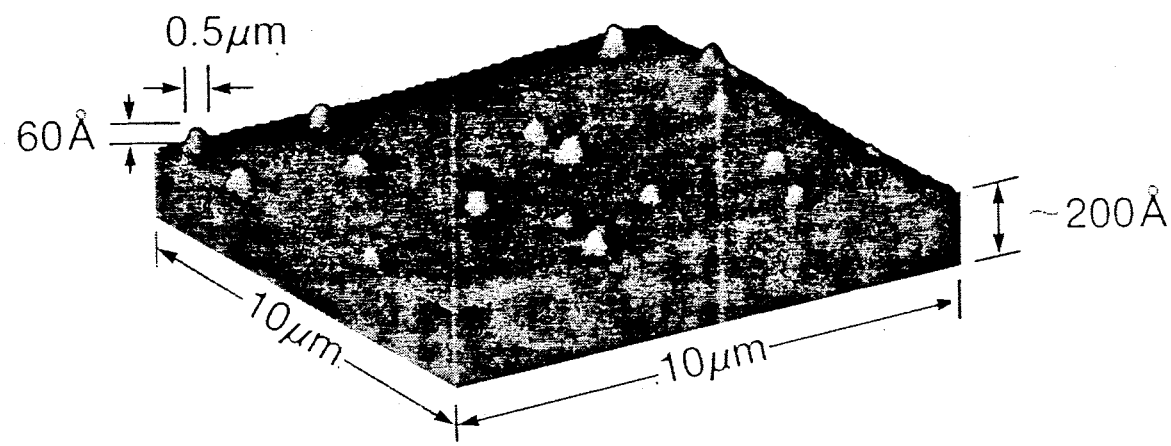
FIGS. 1(a) and (b) are atomic force microscope (AFM) micrographs of the surface topographies of an amorphous hydrogenated carbon film with and without W impregnated in the film.

In order to understand the stiction and wear resistance properties of protective carbon overcoats for thin film disks, various types of disks with different overcoats were fabricated.

The thin film disks were fabricated in a Sputtered Films Inc. (SFI) s-gun magnetron sputtering system, using planetary rotation. In general the disk structure consisted of an underlayer (200-300 Angstroms Cr), a magnetic layer (300-500 Angstroms CoPtCr or Co-NiCr), an adhesion sublayer (~50 Angstroms W, Ti or Ta) and a carbon-based overcoat (200 Angstroms). The disks were deposited on substrates of smooth single-crystal silicon (Si) and on both polished and textured AlMg/NiP. The recording metal layer was deposited using DC magnetron sputtering, whereas the overcoat layers were deposited using either DC or RF sputtering. A substrate bias voltage (−50V) was applied during the deposition of the underlayers and the sublayers to promote film adhesion. The magnetic layers and the overcoats were deposited with no substrate bias. Metal additives (Si, Ti, Ta and W), and carbide additives (TiC, TaC and WC) were incorporated at various concentrations up to approximately 10 atomic percent (at. %) into the carbon overcoat by a co-sputtering technique. (As used herein, the percentage amounts of additives shall refer to atomic percent). The concentration of additive in the overcoat was estimated from the calibrated relative deposition rates of the materials from the sputtering targets. The disks were then treated with 20-30 Angstroms of conventional lubricant, such as perfluoropolyethers applied by dip coating or spraying.

The functional characteristics of the overcoats were then determined using CSS tests in instrumented Seagate model ST412 disk files. Strain gauges attached to a fixture supporting the head suspension provided a measurement of the forces acting on the slider. All measurements were made with IBM 3380 type sliders with a 15 gm loading. The stiction value is defined herein as the maximum force exerted on the slider during the initial 60 ms after the disk drive motor start-up. A standard start/stop cycle consisted of a 0.17 minute rest period and a 0.10 minute flying period at a maximum rotational speed of 3600 rpm.

In addition to CSS tests, a number of durability or accelerated wear tests (AWT) were performed on certain of the sample disks. These tests were conducted at 300 rpm, by maintaining continuous slider/disk contact and using an increased slider loading of 30 gms.

The results of these experimental tests are listed in Table 1.

TABLE 1

| Test | Overcoat | Stiction (gms) | Durability (CSS cycles) | AWT Cycles |
|---|---|---|---|---|
| 1 | H—C | >45 | >10,000 | 60-90,000 |
| 2 | H—C/4.2% Si | >50 | 0 | |
| 3 | H—C/7.8% Si | >50 | 0 | |
| 4 | H—C/10.0% Ti | 20-40 | ~3,000 | |
| 5 | H—C/4-7% Ta | 4-20 | ~4,000 | |
| 6 | H—C/4-8% W | 5-8 | >10,000 | |
| 7 | H—C/3.2% TiC | ~10 | ~300 | |
| 8 | H—C/8.5% TaC | ~8 | ~1,000 | |
| 9 | H—C/4-10% WC | 5-10 | >10,000 | >500,000 |

As is apparent from the results in Table 1, only the carbon overcoat with W or WC provided both the desired low stiction and the high durability or wear resistance.

In addition to the results in Table 1, a protective overcoat of an amorphous carbon film with Fe embedded in the carbon film was fabricated by DC magnetron sputter deposition of a graphite target, with an iron strip near the racetrack, in an Ar atmosphere. The resulting amorphous carbon with impregnated Fe also exhibited low friction and high durability. Unlike the amorphous hydrogenated carbon overcoats listed in Table 1, in this particular disk structure there was no hydrogen present in the carbon overcoat. However, it is believed that the low friction and high durability caused by the embedded Fe would also result if the Fe were embedded in an amorphous hydrogenated carbon overcoat.

Figure 1B:
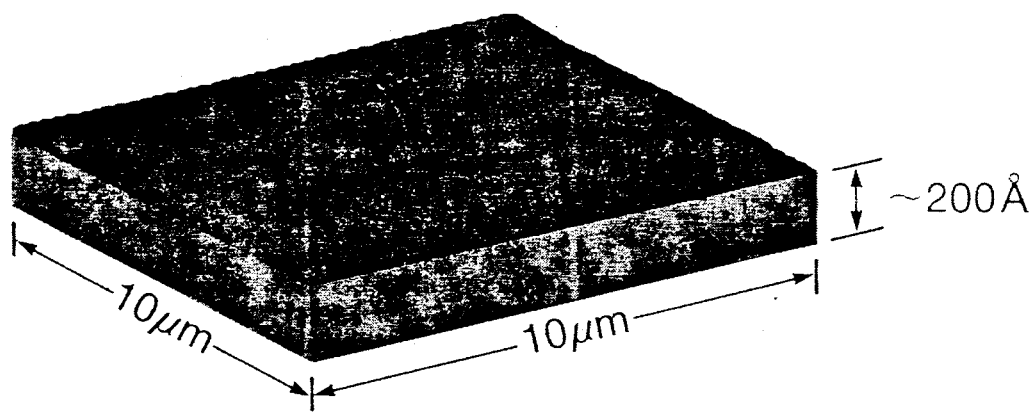

Referring now to FIG. 1(b), there is shown a micrograph by an Atomic Force Microscope (AFM) which illustrates the surface topography of a hydrogenated carbon overcoat of 200 Angstroms thickness with no metal or metal carbide particles present. Referring now to FIG. 1(a), there is a similar AFM micrograph of a protective overcoat of a hydrogenated carbon film with 6% W. In the particular micrograph of FIG. 1(a) there are peaks having a height of approximately 60 Angstrom which are believed to be microcrystaline clusters of W projecting from the substantially planar carbon surface. It is this "microroughness" characteristic of the protective overcoat which is believed to produce the low initial static friction. This microroughness has also been observed for the overcoats with embedded WC.

The stiction and AWT tests of the overcoats were carried out on smooth Si, as described above. Reduced stiction was also achieved for W and WC impregnated overcoats formed on polished AlMg/NiP substrates, but it was found that for adequate durability (>10K CSS cycles) a mechanically hard underlayer was required between the substrate and the magnetic film. The stiction characteristics of 5% W impregnated hydrogenated carbon overcoat deposited in the same pump down on both polished silicon and polished AlMg/NiP substrates are compared in FIGS. 2(a) and 2(b). In the case of the AlMg/NiP substrate a 1200 Angstrom W underlayer was formed beneath the magnetic layer. It can be seen that the stiction behavior is reasonably similar, although there is considerably more scatter for the AlMg/NiP substrate.

Figure 3A:
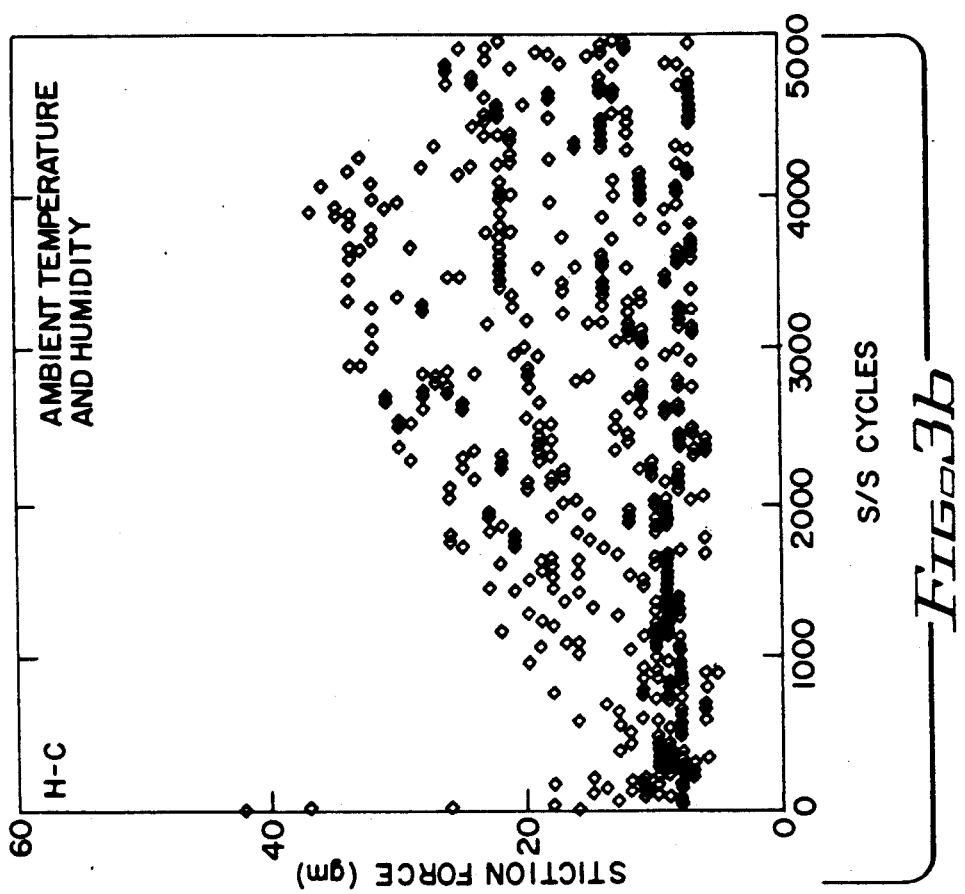
FIGS. 3(a) and (b) are plots of initial stiction (in grams) as a function of CSS cycles for a tungsten carbide (WC) impregnated amorphous hydrogenated carbon film formed on textured NiP substrate, and for an amorphous hydrogenated carbon film without WC formed on a textured NiP substrate.
Figure 3B:
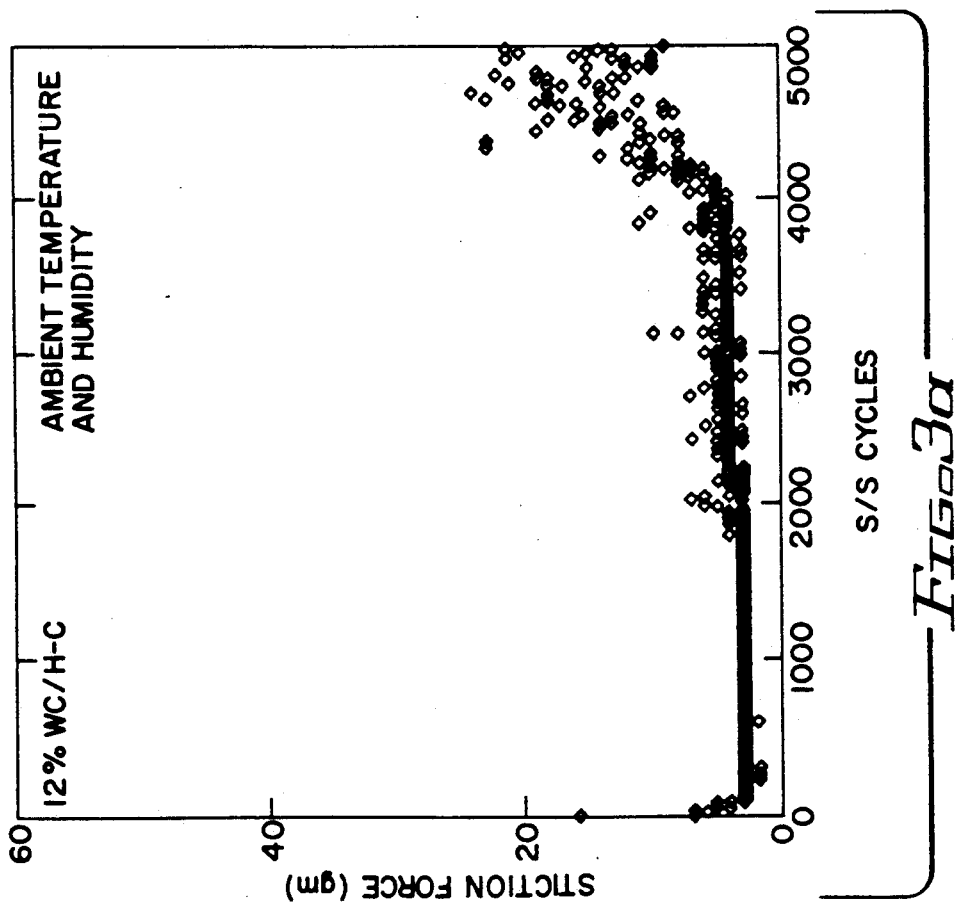

Significant stiction reduction has also been observed with a W impregnated hydrogenated carbon overcoat formed over textured NiP substrates without a hard underlayer. A comparison is given in FIGS. 3(a) and 3(b), for a 12% WC impregnated overcoat and an overcoat without WC, both prepared under similar deposition conditions. In addition to the use of a textured NiP substrate, these films differed from those previously described in that the W impregnated overcoat was sputtered from a compound target containing graphite and 12% WC. The 12% WC impregnated carbon overcoat whose data is depicted in FIG. 3(a) exhibited low and reasonably stable stiction during the first 4000 CSS cycles. Wear was observed on the overcoat at approximately 6000 CSS cycles. Nevertheless, the results given in FIGS. 3(a) and (b) establish that stiction improvement can be achieved by sputtering the overcoat from a single target and can benefit thin film disks using textured substrates.

It has also been found experimentally that if the W or WC is present in too large an extent in the carbon overcoat, the benefits of low static friction are substantially reduced. In particular, the reduced disk durability (approximately 6000 CSS cycles) for the 12% WC overcoat, FIG. 3(a), appears to illustrate the onset of this phenomenon. This phenomenon is believed consistent with the depiction of the overcoat topography in the AFM micrograph in FIG. 1(a) in that the benefit of the microroughness is eliminated if the W or the WC is present to such an extent that it produces a more continuous surface topography without the peaks of W or WC clusters.

While the preferred embodiments of the present invention have been illustrated in detail, it should be apparent that modifications and adaptations to those embodiments may occur to one skilled in the art without departing from the scope of the present invention as set forth in the following claims.

We claim:

1. A thin film metal alloy rigid magnetic recording disk comprising:
   a substrate;
   a magnetic layer comprising a cobalt-based alloy formed over the substrate; and
   a protective overcoat formed over a magnetic layer, the overcoat being a film having a substantially planar surface and comprising primarily carbon in the essentially amorphous form and one or more of tungsten (W) or tungsten carbide (WC) distributed throughout and embedded within the carbon, the tungsten as temperature carbide being present in the carbon in the range of approximately 4 to approximately 12 atomic percent and in the form of clusters which project above the substantially planar surface of the overcoat film.

2. A thin film disk according to claim 1 wherein the primarily carbon overcoat film also includes hydrogen.

3. The thin film disk according to claim 1 wherein the substrate is single crystal silicon.

4. The thin film disk according to claim 1 wherein the substrate is a textured NiP surface coating formed on an aluminum alloy disk.

5. The thin film disk according to claim 1 wherein the substrate is an untextured NiP surface coating formed on an aluminum alloy disk, and further comprising an underlayer between the magnetic layer and the NiP coating.

6. An improved contact start/stop (CSS) magnetic recording rigid disk file wherein the improvement comprises at least one thin film metal alloy magnetic recording disk having a protective overcoat with a substantially planar surface and comprising essentially amorphous carbon or essentially amorphous hydrogenated carbon, the overcoat containing approximately 4 to approximately 12 atomic percent tungsten or tungsten carbide present as clusters which project above the substantially planar surface of the overcoat.

* * * * *

UNITED STATES PATENT AND TRADEMARK OFFICE
CERTIFICATE OF CORRECTION

PATENT NO. : 5,030,494

DATED : July 9, 1991

INVENTOR(S) : R. H. Ahlert, et al.

It is certified that error appears in the above-identified patent and that said Letters Patent is hereby corrected as shown below:

CLAIM 1, Column 6, Line 12, delete "tungsten as temperature carbide"

to read--"tungsten or tungsten carbide"--.

Signed and Sealed this

Fourth Day of May, 1993

Attest:

MICHAEL K. KIRK

Attesting Officer

Acting Commissioner of Patents and Trademarks